United States Patent [19]

Barancik et al.

[11] Patent Number: 5,007,818
[45] Date of Patent: * Apr. 16, 1991

[54] APPARATUS FOR THERMOPLASTICALLY SHAPING POLYMERIC RESINS

[75] Inventors: Martin B. Barancik, Evansville, Ind.; Erich O. Teutsch, Pittsfield, Mass.

[73] Assignee: General Electric Company, Mt. Vernon, Ind.

[*] Notice: The portion of the term of this patent subsequent to Jan. 30, 2007 has been disclaimed.

[21] Appl. No.: 409,356

[22] Filed: Sep. 19, 1989

Related U.S. Application Data

[63] Continuation-in-part of Ser. No. 28,647, Mar. 20, 1987, Pat. No. 4,897,028.

[51] Int. Cl.⁵ ............................................... B29F 1/08
[52] U.S. Cl. ...................................... 425/144; 265/25; 265/DIG. 46; 425/378.1; 425/DIG. 13
[58] Field of Search .......... 264/22, 25, 40.1, DIG. 46; 425/143, 144, 378.1, DIG. 13

[56] References Cited

U.S. PATENT DOCUMENTS

| | | | |
|---|---|---|---|
| 3,158,899 | 12/1964 | Demeter | 425/378.1 |
| 3,185,432 | 5/1965 | Hager | 425/DIG. 13 |
| 3,761,550 | 9/1973 | Seefluth | 264/25 |
| 4,370,115 | 1/1983 | Miura | 425/543 |
| 4,387,165 | 6/1983 | Youngblood | 425/121 |
| 4,484,883 | 11/1984 | Honda et al. | 425/144 |
| 4,514,160 | 4/1985 | Davidsmeyer | 425/549 |
| 4,897,028 | 1/1990 | Barancik et al. | 425/144 |

*Primary Examiner*—Charles Hart
*Attorney, Agent, or Firm*—Martin B. Barancik; Joseph T. Eisele

[57] ABSTRACT

Apparatus for the thermoplastic shaping of polymeric resins is improved by the use of thin-film resistance heaters as the means of applying thermal energy to the resin. The heaters are mounted on the resin molding surfaces.

6 Claims, 3 Drawing Sheets

APPARATUS FOR THERMOPLASTICALLY SHAPING POLYMERIC RESINS

CROSS-REFERENCE TO RELATED APPLICATION

This application is a continuation-in-part of our co-pending U.S. patent application Ser. No. 028,647 filed on Mar. 20, 1987, now U.S. Pat. No. 4,897,028.

BACKGROUND OF THE INVENTION

1. Field of the Invention

The invention relates to apparatus for the thermoplastic shaping of thermoplastic polymeric resins and more particularly relates to such apparatus including an improved means of maintaining the thermoplasticity of the resin during shaping and minimizing the cooling period.

2. Brief Description of the Prior Art

The prior art literature is replete with descriptions of apparatus for thermoplastically processing thermoplastic, synthetic, polymeric resins; see for example the descriptions given in the U.S. Pat. Nos. 2,859,476; 3,308,508; 3,404,432; 3,820,927; 3,402,427 and 4,512,730.

In general, such apparatus includes resin extruders, inflection molding apparatus, blow-molding apparatus, thermoplastic resin coating devices, resin laminators and like apparatus. Processing in such apparatus may include mixing, plasticizing, shaping or simply carrying the resin in a thermoplastic state from one point to another point.

In common to all of the above-described apparatus and devices for processing thermoplastic polymeric resins are associated means for obtaining and, maintaining thermoplasticity of the resin during processing, such as the shaping of the resin material into an article. Maintenance of thermoplasticity may require both heating and cooling of the resin at various times in the processing of the resin. Cooling may be needed to avoid thermal degradation of the resin. Almost all of the resin processing techniques rely at least in part on heating or cooling of the polymeric resin by thermal transfer through the agency of a metal surface, part of the processing apparatus. Heat is generally applied to an outside surface of the metal apparatus by concentrated heat sources such as band heaters, or from within the body of the metal part by heater rods or circulating, heated fluids such as air, water or other chemical liquids. In all cases, the metal heat transferring components have to be of substantial thickness and mass to resist extreme pressures and mechanical forces. The large metal mass responds slowly to changes in thermal input or cooling so that precise control of narrow temperature ranges within a mold is difficult to control as well as the achievement of rapid cooling and heating cycles. Also, when temperature differences are desired in adjacent zones of the same mold, it is difficult to localize the particular and different temperatures to be maintained for appreciable periods of time. This shortcoming is especially troublesome for relatively complex molding techniques and apparatus, such as in the molding of large parts.

The improved mold apparatus of the invention includes as a means for controlling thermoplasticity of a resin within a mold, thin film heaters which may be mounted in close association with the thermoplastic polymeric resins being processed in the apparatus. Heavy metal components to achieve thermal transfer to the resin are not necessary. There can be a saving of weight, materials and labor in manufacture. With the closer juxtaposition of the heating element to the shaping plastic, a closer control of resin temperature is maintainable with quicker response times to maintain a predetermined resin temperature, even in adjacent but different zones or localities of the same mold. The lower thermal mass of the mold elements is more responsive to cooling or changes from heating to cooling or cooling to heating.

SUMMARY OF THE INVENTION

The invention comprises, an apparatus for the production of a thermoplastically moldable polymeric resin article of a predetermined shape, by shaping the resin while in a thermoplastic state and which comprises; a mold having
  (i) mold walls including a molding surface defining the predetermined shape; and
  (ii) means associated with the mold walls for controlling the thermoplasticity of the resin being shaped; the improvement, which comprises;
as the means for controlling the thermoplasticity of the resin being shaped, a thin-film resistance heater disposed on the molding surface.

The improved apparatus of the invention is useful, for example, to shape thermoplastic, polymeric resins. One embodiment of the improved apparatus of the invention is particularly advantageous for shaping such resins when close control of resin melt temperatures is required. A second embodiment of the invention is particularly useful for situations wherein rapid thermal cycling is required as in injection molding, blow molding. Additionally, the molded article has improved surface aesthetics, even when a filler such as glass fiber is present.

DETAILED DESCRIPTION OF THE PREFERRED EMBODIMENTS OF THE INVENTION

Those skilled in the art will gain an appreciation of the invention from a reading of the following description of the preferred embodiments of the invention, in conjunction with a viewing of the accompanying drawings of FIGS. 1-5, inclusive.

Figure 1:
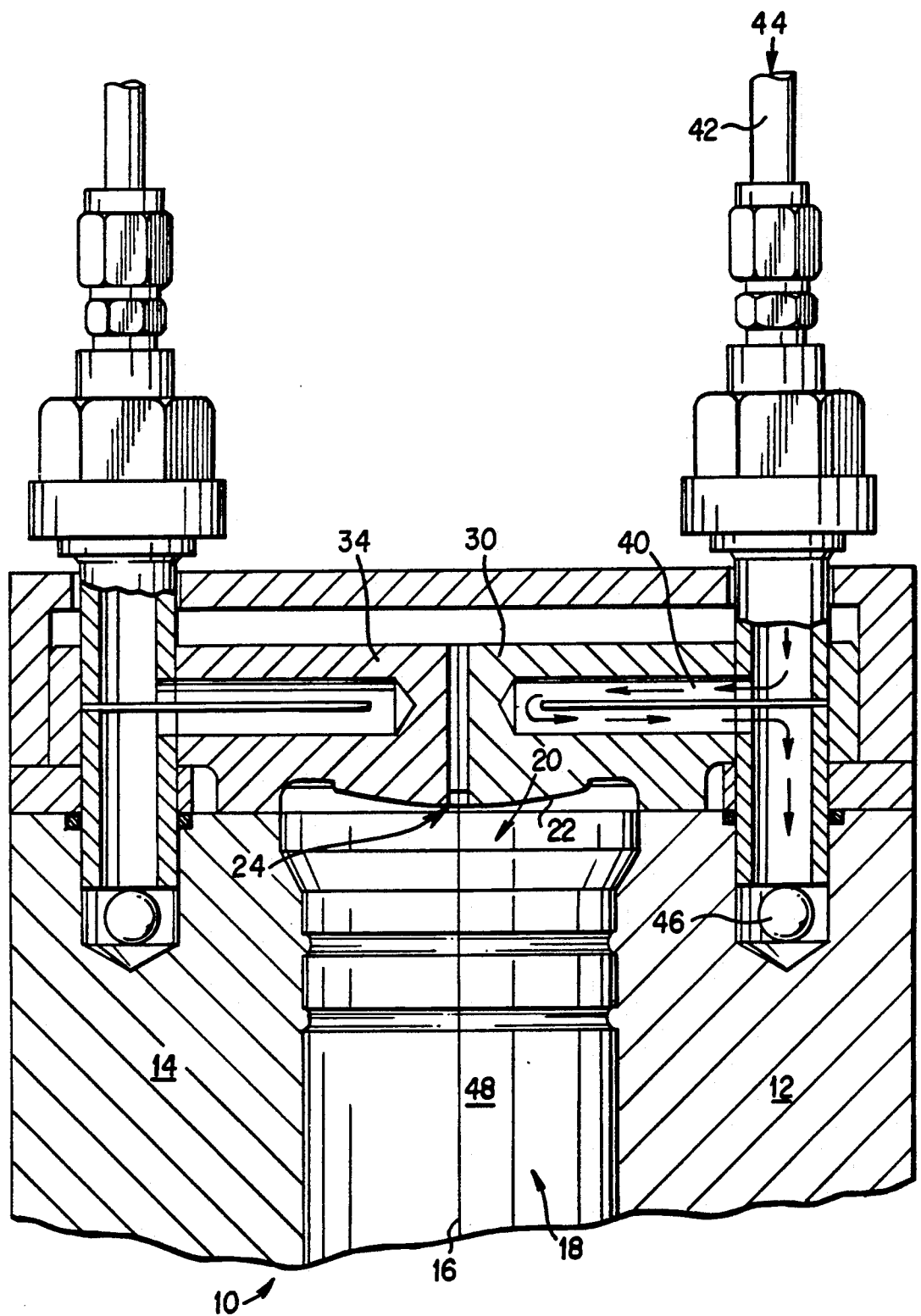
FIG. 1 is a fragmentary cross-sectional side elevation of an improved mold assembly, of the invention.

Referring first to FIG. 1, a fragmentary, cross-sectional side view of an embodiment apparatus of the invention, there will be seen a mold assembly 10 of the invention. The mold assembly 10 comprises a split mold made up of mold half sections 12 and 14. At least one of the two mold sections 12, 14 is movable towards and away from the other. Preferably both sections 12, 14 are movable. When moved together they join along line 16 to define and enclose at least partially a mold cavity 18 which is adapted by size and configuration to shape a tubular parison of a polymeric resin into a hollow article by the well-known extrusion blow molding process. The mold cavity 18 which is otherwise closed, when sections 12, 14 are brought together, generally has an opening 20 in the end 22 through which an extrusion of a tubular parison of an extruded polymeric resin protrudes after insertion between the mold sections 12, 14 and closing of the mold. The mold sections 12, 14 may be manufactured from any conventional mold material, preferably aluminum or machined steel. Pinch-off of and severing the tubular parison extension occurs at site 24 when the mold sections 12, 14 are in the mold closed position, due to a further closing action accomplished in part by pincer means 30, 34. As shown in the FIG. 1, the pincers 30, 34 are inletted to receive in a closed conduit 40 circulation of a cooling fluid such as water to maintain a desired temperature of the portions of the pincers 30, 34 which will contact the thermoplastic parison. In practice, it may be desirable to maintain the pincers 30, 34 at a temperature below the temperature of the thermoplastic prison to be pinched-off. Cooling water circulates from a cooling water source (not shown in FIG. 1) through conduit 42, entering from inlet 44 and existing from water outlet 46. In the prior art apparatus, the transfer of heat to or from the resin was from the mass of the upper and lower plates 12, 14 which were relatively heavy metal plates. The input of heat to the plates 12, 14 may have been through the agency of band heaters attached to the outer periphery of the assembly 10, adding to the weight and mass of the apparatus. The precise control of resin temperature was often difficult to achieve.

Figure 2:
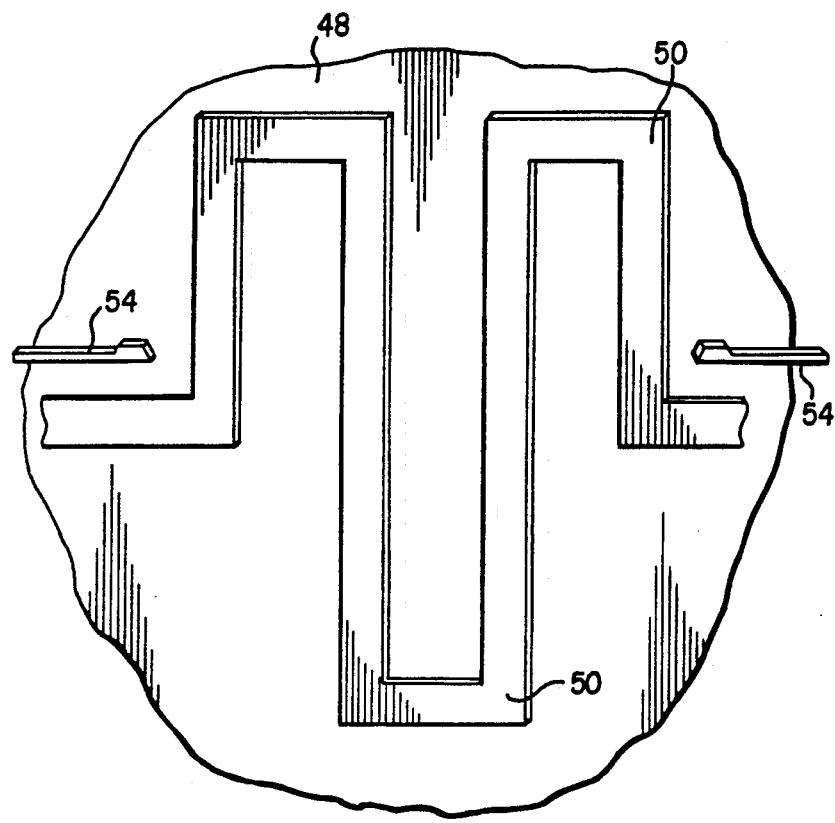
FIG. 2 is an enlarged view of a portion of the molding surface defining the resin shaping chamber shown in the improved assembly of FIG. 1.

FIG. 2 is an enlarged view of a portion of the resin chamber 18 wall 48 showing thin-film resistance heaters 50 mounted on the wall 48 of the chamber 18. Interposed between the heaters 50 are thermistors 54 for sensing temperatures between the grids formed of resistance heaters 50. The separate heaters 50 in the form of single strips or grids may be used to zone heat the chamber 18.

Figure 3:
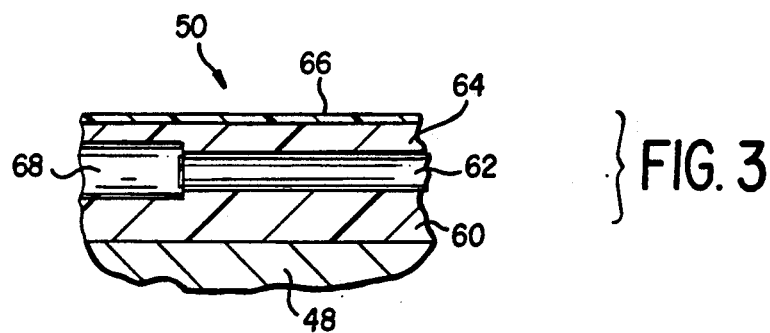
FIG. 3 is an enlarged, schematic view of the resistance heater element shown in FIG. 2.

FIG. 3 is an enlarged view of a part of resistance heater 50 element shown in FIG. 2. In direct contact with the machined steel wall 48 is an electrically non-conductive, insulating layer 60. Preferably the layer 60 is a high temperature, electrical and thermal insulator material, which will readily adhere to the wall 48, for example a film of a ceramic oxide such as silicon dioxide, aluminum oxide, chromium oxide and the like. Overlying the insulative layer 60 is an electrical resistance film 62 of a material having temperature stability sufficient to function as a resistance heater element. The resistance film 62 may, for example, be a film of an electrically conductive metal, metal alloy, intermetallic compound or semi-conductive metal oxide or nitride. A thin strip of a metal such as a foil of nickel, silver, copper, aluminum or an alloy thereof can be used to fabricate the resistance heater film 62. Preferably the resistance element can be a sputter coating of the above mentioned materials and particularly titanium in its nitride form. This film 62 is connected electrically through a connector 68 within an electrical circuit, so that when the circuit is energized, electrical current will flow through the resistance film 62, resulting in the creation of thermal energy for release from the film 62.

Thin-film resistance heaters per se and the method of their manufacture are well known in the art; see for example the descriptions given in U.S. Pat. Nos. 2,899,658; 3,071,749; 3,469,226; 3,517,436 and 4,297,670. The heaters may be selected to provide any desired output of BTU.

Overlying the heater film 62 is a second electrically insulative layer 64 which may be of a material such as described in relation to the electrically insulative layer 60 but advantageously is a good thermal conductor, transparent to infra-red radiation from the resistance heater film 62. An example of such an advantageous material is beryllium oxide. Overlying the insulative layer 64 is a protective film 66 which is normally in contact with the resin. It is advantageously a material characterized by high wear resistance, thermal conductivity, chemical inertness, high natural lubricity and resistance to degradation at high temperatures. Representative of such film materials are coatings of titanium, titanium alloys, chrome, electroless nickel and the like. In some applications, it may be advantageous to have the electrical resistance film 62 in direct contact with the resin such as an injection mold. Examples of other applications include those wherein electrically conductive material, such as metal flakes, are not present in the resin and where other conductive mechanical components such as a screen in an extruder is not present.

The thin film heaters 50 may be varied in thickness, advantageously within the range of from about 0.01 to about 1.0 mm and may be situated as needed to maintain a predetermined temperature at a selected zone or site within the chamber 20.

The controlled temperature of the resin flowing through the chamber 18 permits formation of a uniform resin distribution and subsequent shaping. The temperature of the resin flowing through the chamber 18 is controlled by use of the heaters 50. With inefficient temperature control, some of the distributed resin may be degraded to the point of reduced utility. For example, polycarbonate of a melt extrusion grade requires a temperature of circa 527F. to achieve the proper melt viscosity for extrusion blow-molding. This is a relatively narrow range and if the resin is exposed to a higher temperature for any prolonged period of time, some degradation of the resin may occur. When a plurality of Individual heaters 50 are spaced apart on the chamber 18, the heaters 50 individually zone heat areas within the chamber 18 to help balance temperatures within the processing chamber 18. The correct balance of thermal energy input from the heaters and thermal energy dissipation from the apparatus assure temperature control of the resin without degradation. The zone heater elements may be individually energized and de-energized to maintain a pre-determined melt temperature in zones of the resin melt distribution chamber 18. Thermocouples such as thermistors 54 may be associated with each of the zone heating elements as part of a conventional energizing and de-energizing electrical circuit to aid in the desired temperature control.

Figure 4:
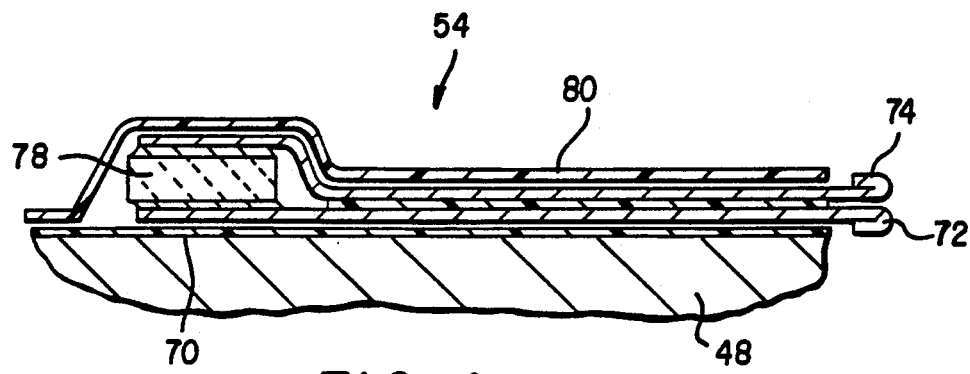
FIG. 4 is an enlarged, schematic view of a thermistor component for sensing the temperature in the vicinity of the heater element of FIG. 3.

FIG. 4 is a cross-sectional side elevation of a portion of the thermistor 54 shown mounted on the chamber wall 48, in FIG. 2. The thermistor 54 produces an analog electrical representation of a sensed temperature and comprises an insulative layer 70 adhered to the wall 48. The layer 70 may be an electrically and thermally insulative layer of the same material described above as useful for the thin-film resistance heaters 50 insulative layer 60. An outer electrically insulative layer 80 may be a thermally transparent material such as that described above as useful for layer 66 of the thin-film resistance heaters 50. The layers 70, 80 form an envelope to enclose insulated lead conductors 72, 74 which are part of an electrical circuit which includes electrical connection with ceramic thermistor 78. Advantageously, the thermistor 54 is one selected to operate with optimum efficiency at a temperature appropriate to the temperatures desired for processing of the resin in the shaping chamber 18. Thermistors, particularly thin-film thermistors for operation at such temperatures, are well known to the art (sometimes referred to as resistance temperature detectors) as are methods of their manufacture; see for example the descriptions given in the U.S. Pat. Nos. 4,317,367; 4,359,372 and 4,434,416.

Figure 5:
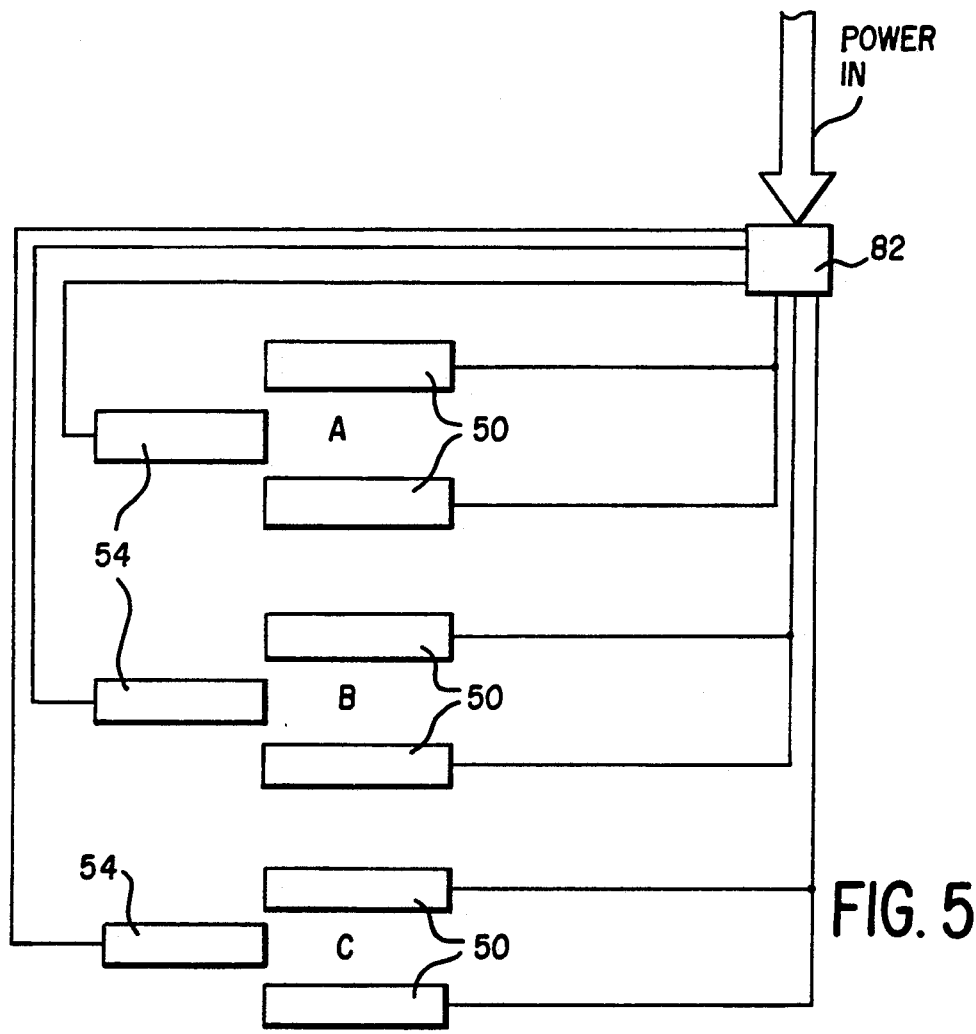
FIG. 5 is a schematic diagram of an electrical circuit which comprises a means of maintaining a predetermined resin melt temperature within the resin shaping chamber shown in FIG. 1.

FIG. 5 is a schematic diagram of an electrical circuit which may be employed to operate a heater 50 or a plurality of heaters 50 positioned in different heat zones A, B, C of the chamber 18 and controlled by a plurality of thermistors 54. As shown in the FIG. 5, a plurality of thin-film resistance heaters 50 are electrically connected with an electrical power source through the agency of an electrical controller 82. Any conventional power module may be connected to the controller 82 which comprises a plurality of solid state relays for energizing and de-energizing the heaters 50 and/or a solenoid valve controlling coolant flow. The circuit power lines to the pairs of heaters 50 (each pair being in a different heat zone A, B or C) are energized or deenergized in response to an output signal from the controller 82 initiated by an input signal from the associated thermistor 54 to the controller 82 or by an appropriate timer. The thermistors sense and signal when the temperature falls below or exceeds a pre-determined and desired set point, i.e., when a temperature gradient exists between the set point and the actual temperature sensed in one of the heat zones A, B or C. The analog signal may be converted to a digital signal by an analog to digital converter before entry in a microprocessor component of the controller 82. Set points for a desired resin temperature may be manually entered in the microprocessor and stored in the processor memory. The digitized signal can be compared with the temperature set point. The controller 82 may be a conventional and known multi-channel digital controller, which includes a micro-processor component for proportional control, i.e., capable of varying the magnitude of the energizing current to heater 50, proportioned to the magnitude of the temperature gradient sensed by the thermistor 54, to be changed in order to maintain the predetermined and desired temperature in any one of the zones A, B or C. Alternatively, the heaters 50 may be energized fully at any time, for times sufficient to change the aforesaid temperature gradient (time proportioning). In any of the zones A, B or C, having an associated cooling means, a solenoid valve may be operated by the controller 82 to control a flow of coolant fluid past the zone. The solenoid would be controlled by the same time proportioning signal from the sensor 54, i.e., the solenoid valve may be opened fully for a period of time proportional to the temperature gradient to be reduced.
In the controller 82, the micro-processor can compare a stored temperature set point for the zone A, B and C and generate an output control signal for correction when a temperature gradient occurs, for correction by heating or cooling. The microprocessor can also be programmed to change the temperature set point in a zone downstream (for example in zone B, downstream from zone A) when the temperature in the upstream zone (zone A) has gone awry and some correction is necessary to assure that the resin melt passing from the zones A, B and C is within a critical parameter.

It will be appreciated by those skilled in the art that the scope of the invention is not limited by the description of the preferred embodiments given above and that the invention may be employed to improve a wide variety of apparatus for the shaping of thermally plasticized polymeric resins. The apparatus which will be improved by the invention includes apparatus employed for:

1. Injection Molds (large part, long flow channels). The interior surface of the mold bearing the film heater provides a hot mold surface during injection, but would allow rapid cooling due to the low thermal mass of the film heater. This results in the ability to use shorter cycle times and lower melt temperatures.

2. Coextrusion Blow Molds. The ability to use different heat zones on the mold surface permits one to use lighter mold construction, better control distribution, manufacture more complex shapes, reduce heat-up time and use more widely varying melt temperature polymer resin combinations.

4. Other applications include, but are not limited to static molds, rotational molds, thermoforming molds and any other resin shaping molds where application of heat is involved, and especially when rapid temperature cycling is desired.

The improved shaping apparatus of the invention may be used to thermally shape any conventional and known processable polymeric resins including, for example, cellulose esters and ethers such as ethyl cellulose acetate, acetobutyrate, and acetopropionate; vinyl and vinylidene polymers and copolymers such as polymers and copolymers of vinyl chloride, vinyl acetate, vinylidene chloride, polyvinyl alcohol, polyvinyl butyral and polymers and copolymers of olefins, such as ethylene, propylene and butylene; polymers and copolymers of styrene, 2-methyl styrene and their mixtures of elastomeric copolymers; polyamides, interpolyamides such as polyhexamethylene adipamide, polycaproloctam, polyundecanamide, polyhexamethylenesebacamide; polycarbonates; polyaldehydes, polyethers; polyurethanes; polyesters, natural and synthetic thermoplastic elastomers; thermoplastic fluorinated resins; silicone thermoplastic elastomers, moldable thermoset resins such as phenolics, epoxides and the like.

These thermoplastic resin materials may be used neat or in admixture with fillers, plasticizers, colorants, or other ordinary additives, provided they do not prevent processing.

What is claimed is:
1. An apparatus for the production of a thermoplastically moldable polymeric resin article of a predetermined shape, by shaping the resin while in a thermoplastic state and which comprises; a mold having
    (i) mold walls including an interior molding surface defining the predetermined shape; and
    (ii) means associated with the mold walls for controlling the thermoplasticity of the resin being shaped;
the improvement, which comprises;
as the means for controlling the thermoplasticity of the resin being shaped, a thin-film resistance heater disposed on the molding surface.

2. The improved apparatus of claim 1 wherein there is temperature control means associated with the means for thermoplasticity.

3. The improved apparatus of claim 2 wherein the temperature control means comprises a thermistor mounted on the mold surface.

4. The improved apparatus of claim 1 wherein a plurality of thin-film resistance heaters operates in separate zones of molding surface.

5. The improved apparatus of claim 1 which further comprises means for cooling the resin in the mold.

6. The improved apparatus of claim 1 wherein the mold is selected from the group consisting of an injection mold, compression mold, thermoforming mold, blow mold and rotational mold.

* * * * *